United States Patent [19]
Ellison

[11] Patent Number: 5,138,134
[45] Date of Patent: Aug. 11, 1992

[54] DECORATIVE WALL HANGING HEATER

[76] Inventor: Mearl E. Ellison, 10153 Alondra Blvd., Bellflower, Calif. 90706

[21] Appl. No.: 289,984

[22] Filed: Dec. 22, 1988

Related U.S. Application Data

[60] Division of Ser. No. 34,279, Apr. 2, 1987, Pat. No. 4,817,906, which is a continuation-in-part of Ser. No. 579,113, Feb. 10, 1984, abandoned.

[51] Int. Cl.$^5$ .......................... H05B 3/28; A47F 7/14; G08B 13/14; G08B 13/24
[52] U.S. Cl. ...................... 392/448; 219/343; 248/476; 248/542; 340/551; 340/571
[58] Field of Search ............ 219/345, 343, 358; 340/551, 552, 553, 547, 568, 571, 652; 40/152.1; 248/551, 475.1, 476, 495, 542

[56] References Cited

U.S. PATENT DOCUMENTS

| | | | |
|---|---|---|---|
| 870,098 | 11/1907 | Hartshorn . | |
| 1,229,916 | 6/1917 | Duncan . | |
| 2,299,443 | 10/1942 | Walmsley | 248/29 |
| 2,488,925 | 11/1949 | Miller | 248/31 |
| 2,509,424 | 5/1950 | Denton | 248/31 |
| 2,530,892 | 11/1950 | Mayo | 248/29 |
| 2,624,118 | 1/1953 | Anderson | 32/89 |
| 2,649,530 | 8/1953 | Dietz | 219/20 |
| 2,754,498 | 7/1956 | Lavelle | 340/280 |
| 2,791,388 | 5/1957 | Hirt | 248/31 |
| 2,835,779 | 5/1958 | Kazan | 219/20 |
| 2,873,079 | 2/1959 | Carogana et al. | 248/125 |
| 2,952,431 | 9/1960 | Pedley | 248/28 |
| 2,965,339 | 12/1960 | Denton | 248/28 |
| 3,071,253 | 1/1963 | Walsh et al. | 211/178 |
| 3,090,948 | 5/1963 | Cremer | 340/280 |
| 3,138,359 | 6/1964 | Stewart | 248/31 |
| 3,160,736 | 12/1964 | Catterson | 219/219 |
| 3,161,964 | 12/1964 | Myles | 33/180 |
| 3,179,544 | 4/1965 | Smith-Johannsen | 156/55 |
| 3,188,028 | 6/1965 | Waller | 248/31 |
| 3,272,464 | 9/1966 | Jacobson | 248/125 |
| 3,298,655 | 1/1967 | Palm | 248/498 |
| 3,307,707 | 3/1967 | Wright | 211/13 |
| 3,311,435 | 3/1967 | Heritage | 312/245 |
| 3,436,138 | 4/1969 | Ressler | 312/242 |
| 3,453,413 | 7/1969 | Reynolds, Jr. | 219/345 |
| 3,478,997 | 11/1969 | Goss | 248/488 |
| 3,612,823 | 10/1971 | Ellison | 219/345 |
| 3,826,013 | 7/1974 | Baher | 33/390 |
| 3,859,504 | 1/1975 | Motokawa et al. | 392/448 |
| 3,881,257 | 5/1975 | Chasen | 33/354 |
| 3,955,790 | 5/1976 | Ballin | 248/489 |
| 4,163,144 | 7/1979 | Reynier | 219/368 |
| 4,228,982 | 10/1980 | Sellera | 248/467 |
| 4,241,510 | 12/1980 | Radecki | 33/180 |
| 4,300,130 | 11/1981 | Fotheringham et al. | 340/568 |
| 4,365,240 | 12/1983 | Scarpino, III et al. | 340/571 |
| 4,438,430 | 3/1984 | Young et al. | 340/547 |
| 4,458,241 | 7/1984 | Frankenberg | 340/571 |
| 4,473,957 | 10/1984 | Faulkner | 33/180 |
| 4,501,057 | 2/1985 | Palomera | 29/407 |
| 4,549,713 | 10/1985 | Magadini | 248/495 |
| 4,597,554 | 7/1986 | James | 248/542 |

FOREIGN PATENT DOCUMENTS

| | | |
|---|---|---|
| 539127 | 11/1931 | Fed. Rep. of Germany . |
| 1121507 | 1/1962 | Fed. Rep. of Germany . |
| 2621268 | 11/1977 | Fed. Rep. of Germany . |
| 2632721 | 1/1978 | Fed. Rep. of Germany . |
| 2852246 | 6/1980 | Fed. Rep. of Germany . |
| 2438253 | 6/1980 | France . |

*Primary Examiner*—A. D. Pellinen
*Assistant Examiner*—Geoffrey S. Evans
*Attorney, Agent, or Firm*—Stetina and Brunda

[57] ABSTRACT

A wall hanging incorporating a heater is characterized by a low temperature thermostatically controlled heating panel being aesthetically concealed behind a decorative surface, and being configured to be hung on an ordinary wall. The device includes a safety shut-off switch activated by excessive temperature build-up, alarm systems to deter theft, and a wall mounting bracket which permits rapid and level mounting of the wall hanging.

3 Claims, 3 Drawing Sheets

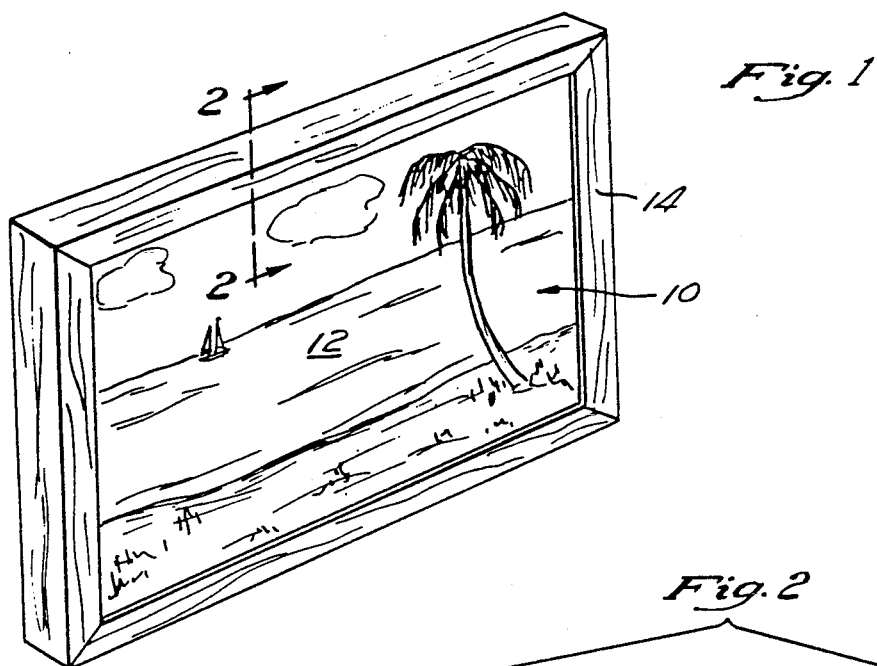
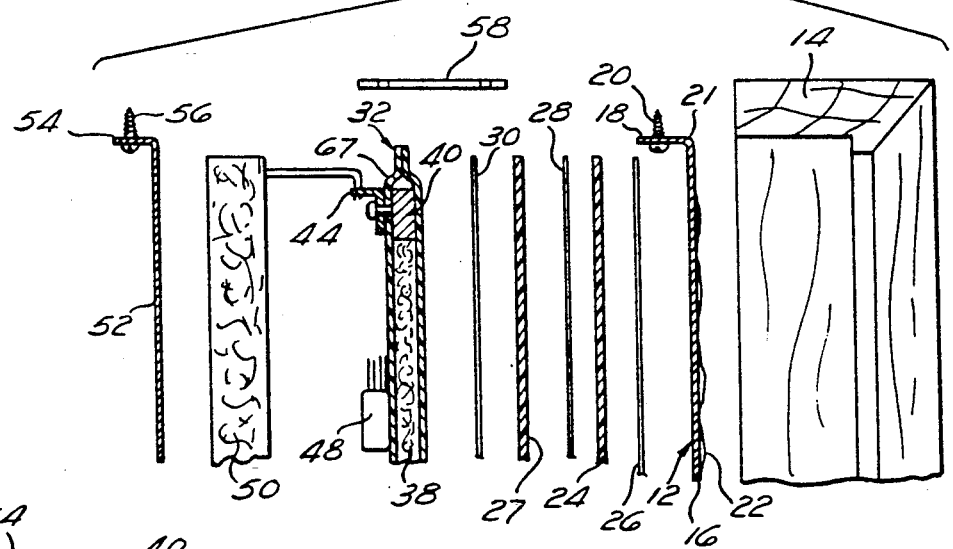
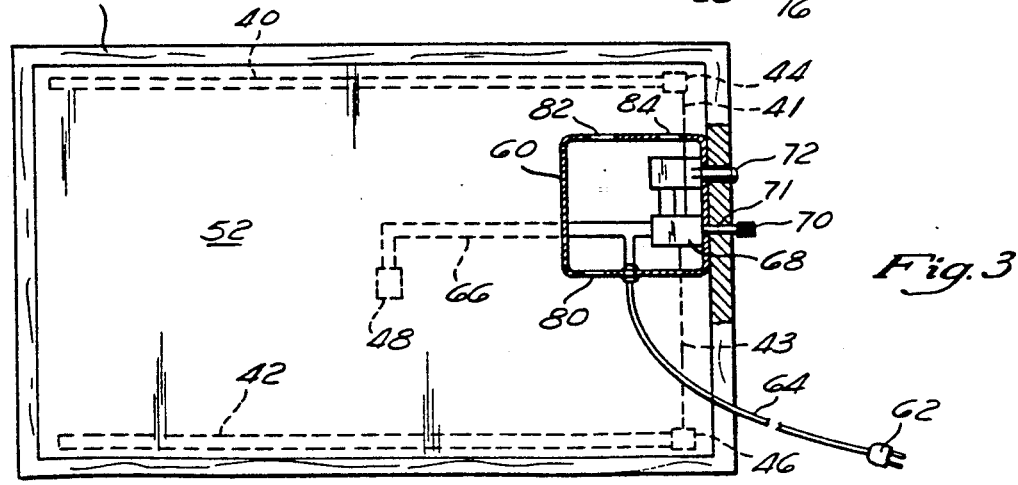

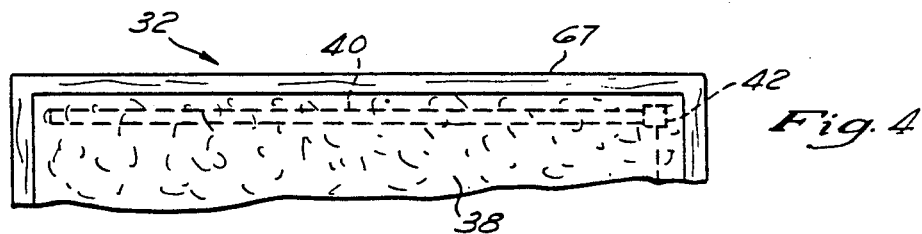
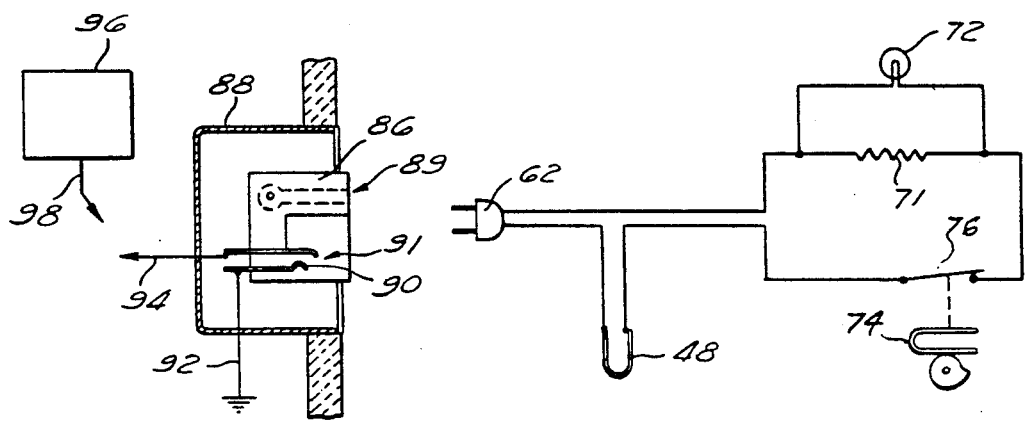
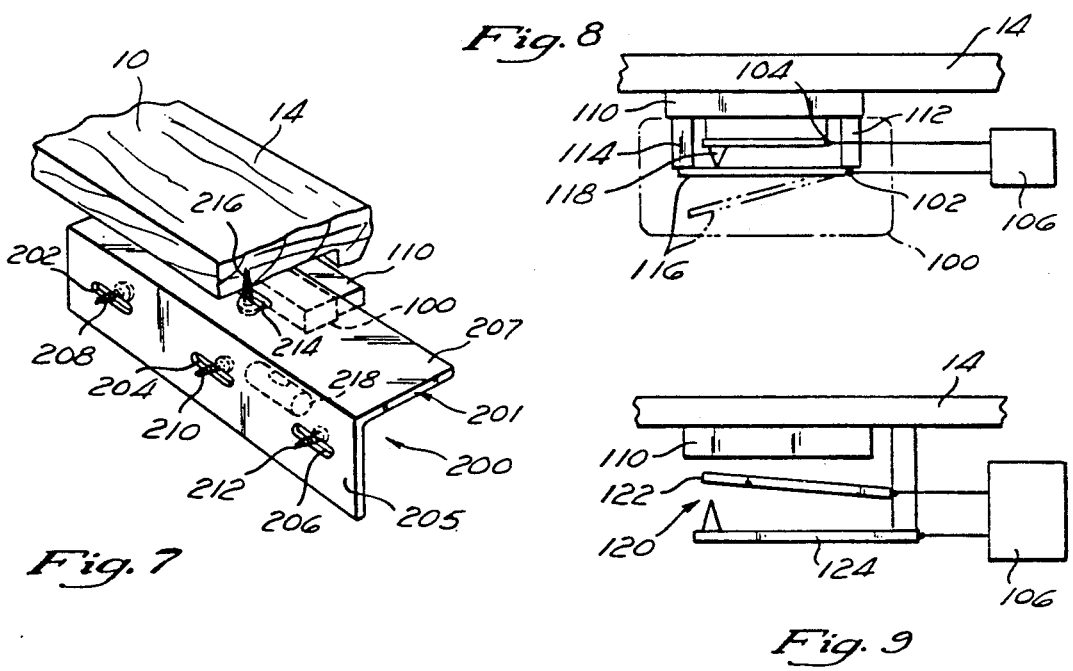

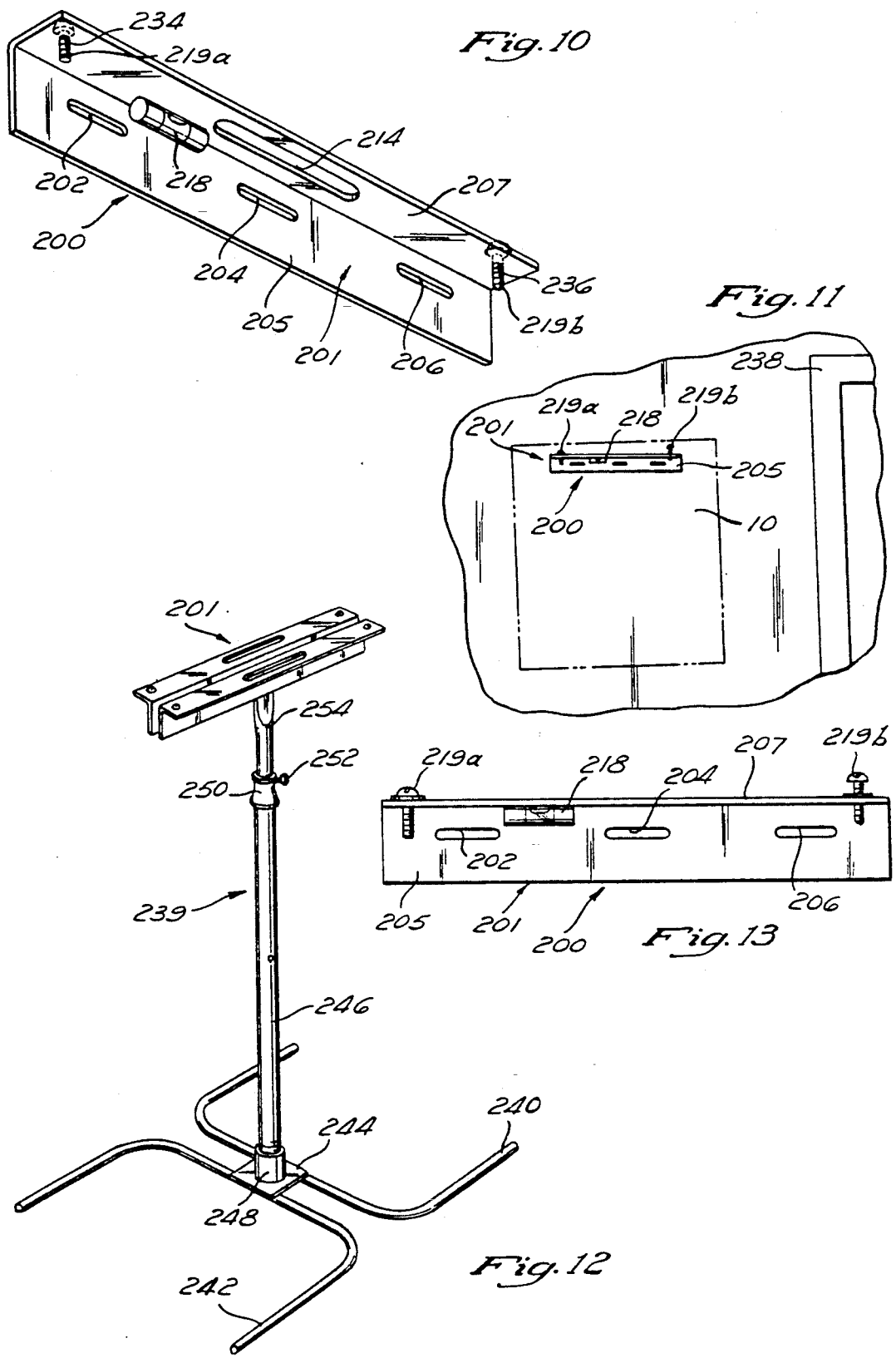

DECORATIVE WALL HANGING HEATER

CROSS REFERENCES TO RELATED APPLICATIONS

This is a divisional application of Ser. No. 07/034,279, which issued as U.S. Pat. No. 4,817,906 which is a continuation-in-part of Applicant's copending application for Combined Decorative Picture and Room Heating Device, Ser. No. 579,113, filed Feb. 10, 1984, now abandoned.

BACKGROUND OF THE INVENTION

This invention relates to a wall hanging including a heat source and more particularly to a wall hanging with a heating panel having a thermostatic control, a safety cut-off switch, and simple alarm means to deter theft.

Heat transfer by radiation and convention have long been used as means for transferring energy in situations where the object to be heated is a relatively small room, and the temperature differential between the room and the outside is relatively low.

Prior devices for heating a small space, such as a room in a residence or a hotel room, include baseboard radiators, radiant heaters attached to or placed in ceilings, radiant heaters in floors and forced air systems. These prior art heating devices are inherently inefficient and even in relatively warm regions, such as Southern California, require about six watts per square foot of floor surface area to provide adequate heating.

There are also radiant wall heating panels. Such heating panels generally operate at relatively lower temperatures, seldom exceeding 150 degrees Fahrenheit, and may further include a decorative type coating so that the panel may be mounted on a wall and still be harmonious with the surroundings. An example of such a heating panel is disclosed in U.S. Pat. No. 3,453,413. Heating panels of this general nature are generally constructed of components especially fabricated for this purpose and have no means for controlling the heat output.

U.S. Pat. No. 3,612,823 to the subject inventor discloses a portable decorative heating device formed as a panel to be hung on a wall to provide heat by both radiation and convection.

SUMMARY OF THE INVENTION

The present invention is an improved device to heat a room primarily by convection currents from a low temperature heating panel that is decoratively concealed in a wall hanging. The present invention provides a simple construction of the heating panel and additionally providing for a safety cut-off switch to prevent heat build-up, a thermostatic control means to regulate the heat output of the invention, and a novel bracket for mounting the frame to a wall.

The invention is designed for use in residences, offices and in commercial settings such as motel rooms, and in other environments where high-output heaters are not practical. The present invention may further provide simple alarm means that will alert the owner of its removal from a wall.

In the preferred embodiment of the invention, the decorative cover comprises a front panel, preferably of 20 gauge paint lock steel, surrounded by a wooden frame. Two panels are positioned behind the front panel, and are comprised of a material that exhibits thermal conducting and electrical insulating properties. A panel heater is positioned behind these layers and generally comprises of a layer of graphite saturated fabric, which receives electrical current from buses on either end of the heater. The insulating layers and the heater are affixed to one another by two sided adhesive tape strips which are placed on the structural surfaces.

In order to protect against excessive heat build-up and potential fire hazard, the panel heater has a bi-thermal cutoff switch which disconnects the source of electricity from the wall hanging should over heating occur. Additionally, a thermostat is provided to variably control the heat output of the wall hanging.

The invention includes a hanging mechanism that provides a convenient sturdy means for securing the wall hanging to a vertical surface. This vertical surface may be a wall or a shelf lip or nearly any other desired support surface. The hanging mechanism consists generally of three elements, an angle bracket, a means for leveling the bracket, and a means for minutely or vernier adjusting the orientation of the wall hanging. The angled bracket is formed having a plurality of slots therein, through which screws secure the bracket to the desired mounting surface. A portion of the bracket extends outward and perpendicularly from the vertical portion to provide a ledge or surface upon which the frame of the wall hanging can rest upon. The ledge portion includes a slot that receives a screw or any convenient protrusion, such as a wooden dowel or peg extending from the frame of the wall hanging, to prevent the wall hanging from sliding off the ledge formed by the outwardly extending or ledge portion of the bracket. This arrangement allows for a reliable but quick engagement and/or disengagement means of the item from the wall. The shape of said slots permits the fasteners to engage wall studs or the like to provide a stable mounting and allows lateral adjustment of the wall hanging relative to the bracket or fasteners. Furthermore, because of the rigidity of the bracket, the bracket enables the mounting of such items to any type of vertical surface capable of supporting the bracket, including to merely a shelf lip.

Also fixedly mounted to said bracket is a bubble level means for determining the horizontal level of the mounting bracket's wall hanging surface. This enables the quick leveling of the bracket without the need or inconvenience of using auxillary leveling means which often times are cumbersome to work with in conjunction with small brackets such as the present one.

Furthermore, with the vernier adjustment mechanism the orientation of the wall hanging can be rapidly changed without having to disengage a fixedly mounted bracket from a set position. In addition, such adjustments can be made in minute quantized increments. This is a distinct advantage over the prior art, wherein such adjustments were made by the hit or miss process of bracket bending or total removal and reattachment of the bracket to the wall. For example, if the item is placed near a non-plumbed structure, such as a door jam, the horizontal level of the picture may be altered without having to remove the wall bracket so that the vertical edge of the wall hanging would not seem so incongruent with said non-plumbed structure.

The invention may include systems to deter the unwanted removal of the wall hanging from the wall. One alarm device is completely concealed, and involves a two connector switch located in the wall receptacle which is closed to complete a circuit when the wall hanging is unplugged from the wall receptacle. The closed circuit can then be used to trigger an alarm, or signaling device, indicating that the wall hanging has been removed. A second alarm system is located on the wall above the wall hanging and contains two connectors separated by a movable connector which is held in a closed position by a magnet located above the wall hanging. When the wall hanging is removed from the wall, the absence of the magnetic force allows the movable contact to break the circuit between the two connectors, thereby activating an alarm system. A third alarm system produces a radio frequency signal in the building wiring if the heater is unplugged from its wall receptacle. A monitoring station receives the alarm signal. The alarm system may also include an audible alarm attached directly to the wall hanging for producing a loud noise in the event of unauthorized removal of the wall hanging from the wall.

Thus, in summary, the present invention provides means by which heat can be controllably delivered to a room from a concealed and aesthetically acceptable wall hanging means for attaching the wall hanging to a wall, and further provides safety features to eliminate the risk of overheating, and several alarm systems to deter unwanted removal.

BRIEF DESCRIPTION OF THE DRAWINGS

These as well as other features of the present invention will become more apparent upon reference to the drawings wherein:

FIG. 1 is a perspective view of the present invention as it would be placed on the wall;

FIG. 2 is an exploded view of the wall hanging of FIG. 1 taken along line 2—2, illustrating the major components of the wall hanging;

FIG. 3 is a view of the backside of the wall hanging showing the back closure panel and the junction box illustrating the structure of the electrical circuitry of the invention;

FIG. 4 is a partial cutaway view of the heater showing the peripheral edge comprising a seal, the bus bar, and the graphite-filled center section;

FIG. 5 is a schematic drawing of the circuits for the thermostat, the indicator light, and the bi-metal thermal cutoff switch;

FIG. 6 is a schematic diagram of the structure and circuitry utilized in one alarm system having a switch for the alarm in the wall receptacle, activated by removal of the plug of the wall hanging;

FIG. 7 is a partial perspective view of the backside of the wall hanging showing the mounting bracket and a second alarm system;

FIG. 8 is a schematic drawing of a second alarm system illustrating the manner in which the alarm circuit is activated by the removal of the magnetic force; and FIG. 9 illustrates an alarm switch that may be used in the second alarm system.

FIG. 10 is a bottom perspective of the mounting bracket displaying the mounting bracket, fixedly mounted level means and vernier adjustment mechanism.

FIG. 11 illustrates the manner in which the painting may be required to deviate from the horizontal after the mounting bracket is secured to the wall.

FIG. 12 is a perspective view of the portable wall heater stand.

FIG. 13 is a frontal view of the bracket with the vernier adjusting mechanism in operation.

DESCRIPTION OF THE PREFERRED EMBODIMENT

The invention comprises, as shown in FIGS. 1 through 13, a wall hanging 10 including as major components: a panel assembly, designated generally by the numeral 12, which is fabricated or painted with any desired portrait or scene, an anti-theft device 100 and a hanging mechanism or device, designated generally by the numeral 200.

Referring to FIGS. 2 and 3, the frame 14 may be any conventional wooden or molded plastic structure. The panel assembly 12 comprises a planar paint panel 16 upon which an aesthetic scene or painting is located. The paint panel 16 is preferably formed of 20 gauge paint lock steel, or an equivalent material, and includes a flange 18 extending from an edge 21 thereof, through which a number of screws 20, typically fourteen to eighteen, secure the panel 12 into the frame 14. The paint panel 16 has upon it a quantity of paint or other decorative coloring 22. It will be recognized that the thicknesses shown in this exploded view are somewhat exaggerated for clarity; in particular, the thickness of the painting 22 or coloring or decorative material is shown in exaggerated proportion.

An insulating layer 24 is secured by means of a plurality of strips of a two-sided adhesive tape 26 to the backside of the paint panel 16. The material of the layer 24 is an electrical insulator but is a thermal conductor. A preferred material is a film known as NOMEX (trademark) manufacturated by E.I. DuPont. Likewise, another layer 27 of NOMEX, or other comparable electrically insulating material, is secured by means of a plurality of adhesive strips 28 to the layer 24 to provide additional electrical insulation. A panel heater 32 is secured by suitable means such as a plurality of two-sided adhesive strips 30 to the backside of the layer 27.

Secured to the backside of the heater 32 is a bi-metal thermal cutoff switch 48, the function of which will be described hereinafter. Next, a layer 50 of insulating material, preferably glass fiber insulating material, covers the heater 32, and finally a back panel 52 having a flange 54 extending around it is positioned adjacent the layer 50. The back panel 52 is secured by suitable means such as a plurality of screws 56 to the frame 14. A conductive bracket 58 electrically connects the paint panel 16 with the back panel 52. This bracket 58 may be simply flat or it may preferably be an L-shaped bracket which will engage an edge of the back panel 52 and secure it to the front panel 16 by means of the screws 20 and 56. The bracket 58 permits the use of a single ground connection (not shown) to electrically ground the external portions of the wall hanging 10 to avoid risks of electric shock to persons and to prevent fires. The panel heater 32 heats the front panel 14 to a temperature of about 150 degrees Fahrenheit while the insulating layers prevent the temperature of the rear panel 52 from exceeding about 100 degrees Fahrenheit, well within safety limits.

Reference is made now to FIGS. 2 and 3 to explain in further detail the structure in electrical operation of the invention. FIG. 3 is a view of the backside of the wall hanging 10 showing the back panel 52 and a junction box 60. The wall hanging 10 includes a heater which provides convection circulated heat to a room in which it is hung. Electricity is provided to the wall hanging by inserting a plug 62 into any convenient electrical outlet. A power cord 64 carries electrical current into the junction box 60 from which a first conductor 66 supplies current to a bimetal thermal cutoff switch 48 which is an absolute cutoff of electricity to the wall hanging 10 should overheating occur. The flow electric current is controlled by a thermostat 68 which includes a control knob 70 having a shaft 71 extending through the frame 14 so that the thermostat is accessible from outside the frame 14. A light 72 is provided to indicate when the wall hanging 10 is operating to provide heat. Electrical current is provided to a pair of bus bar 40 and 42 by means of electrical conductors 41 and 43, respectively, connected to a pair of connectors 44 and 46, respectively. The heater 32 may be conveniently designed to draw power proportional to the cross sectional area, generally 0.5 watts per square inch.

FIG. 4 illustrates the bus bar 40 and the connector 42 being adjacent the graphite saturated fabric 38 along an edge 67 of the heater 32 to provide a uniform and controllable panel heating effect. Heaters of this type are manufactured by Canada Thermal Film, Ltd. of Concord, Ontario, Canada and are sold under the trademark THERMAL FILM.

FIG. 5 schematically depicts the circuitry described above. The plug 62 plugs into a conventional electrical outlet. The flow of electrical current to the rest of the circuitry is controlled by the bi-metal thermal cutoff switch 48. The heater 32 may be conveniently represented to include an electrically resistant heating element 71. The light 72 is connected in parallel with the heating element 71 and glows whenever electrical current passes through the heating element 71. The bimetal thermal cutoff switch 48 is preferably a standard commercially available thermal cutoff switch that is preset to cut off at a desired temperature, such as 210 degrees Fahrenheit, which is satisfactory in most applications. The junction box 60 includes a plurality of vents 80, 82 and 84 in FIG. 3 which allow air flow upwardly through the junction box 60 allow the bi-metal sensor 74 to respond to the air temperature in the room.

FIG. 6 shows a wall receptacle 86 in a conventional junction box 88. The wall receptacle 86 has electrical connectors 89, 91 to provide electricity to an outlet. The connector 91 is a ground connector including a switch comprising contacts 90 and 94 which, when the ground connector of the plug 62 is inserted into the wall receptacle 86, close, forming a circuit between a ground 92 and the contact 94, which is connected to a central alarm 96. The plug 62 and the wall receptacle 86 are most useful in motels and hotels to prevent theft of the wall hanging 10. The contact 94 may be connected to a conventional alarm 96 through a conduit 98. The alarm 96 is inoperative when grounded; but when the ground is broken, the alarm 96 sounds or gives a signal, thus indicating that the plug 62 had been pulled, suggesting the possibility that the wall hanging 10 was being stolen.

The wall hanging 10 may include a second theft alarm unit 100, shown in FIG. 8. The alarm unit 100 is mounted to the bracket 201 connected by a pair of electrical connectors 102 and 104 to a wall-mounted device 106, such as a bell, light, horn or other warning device. Mounted under the top edge of the frame 14 is a bar magnet 110. Inside the alarm unit 100 are a pair of magnetically permeable connectors 112 and 114 and a movable contact 116 which is also a magnetically permeable element. The connector 104 is electrically connected to a contact 118. When the wall hanging 10 is moved into position, for example on a wall, the magnetic flux from the bar magnet 110 passes through the connectors 112 and 114 and the movable contact 116 then closes, thus forming a complete electrical circuit between electrical conduits 102 and 104. When the circuit is closed, the warning device 106 is inoperative. When the wall hanging 10 is moved, the circuit is opened to actuate the warning device 106. Likewise, disconnecting the circuit through lines 102 and 104, such as by removal of the alarm unit 100 would break the circuit and indicate the likelihood of a theft.

As shown in FIG. 9, the alarm unit 100 may include a switch 120 that is open when the wall hanging 10 with the magnet 110 attached thereto is positioned on the bracket 201. A movable contact 122 is spring-biased to be closed when the wall hanging is not in position. The movable contact 122 is magnetically permeable so that having the magnet 110 near causes the contact to move toward the magnet, away from a fixed contact 124 to open the circuit and deactivate the alarm.

Referring to FIGS. 7 and 10, the hanging mechanism or device, designated generally by the numeral 200, comprises an elongate bracket, designated generally by the numeral 201, having an L-shaped cross-sectional configuration. One leg portion 205 of the bracket 201 includes a plurality of elongate slots 202, 204 and 206 through which fasteners such as bolts, screws or nails 208, 210 and 212, respectively, may extend. The other leg portion 207 of the bracket 201, includes a central slot 214 sized to receive the head of a mounting screw 216 which is secured to the undersurface of the frame 14 of the wall hanging 10. The bracket 201 is mounted in a level position using a bubble level 218, shown in FIG. 7, rigidly affixed to the bracket 201 to usually indicate level positioning.

The bracket 201 provides a very firm and sturdy shelf-like mount for the wall hanging 10 and permits rapid level mounting of the wall hanging 10 without the need of auxiliary leveling means such as a carpenter's level. The bracket 201 also permits a reasonable amount of lateral adjustment to position the wall hanging 10 upon a wall. The slots 202, 204, 206 permit selection of locations of the corresponding fasteners 208, 210, 212 so that they may be securely attached to the internal studs of the wall. A screw 216 affixed to the frame 14 passes through the slot 214 to retain the frame 14 upon the bracket 201. The slot 214 permits adjustment of the position of the wall hanging relative to the bracket 201 so that the bracket 201 may be optimally positioned to support the wall hanging 10 and to permit the wall hanging 10 to be placed in a desired location on the wall.

Advantageously, the bracket 201 may be provided with vernier adjustment means 219a and 219b to permit small incremental changes in the leveling of wall hanging 10 after the mounting bracket 201 is fixedly mounted to the wall.

As best shown in FIGS. 10 through 13 the vernier means for minutely adjusting the level of the wall hanging 10 comprises a pair of screws 219a and 219b, threadingly inserted into mating tapped holes 234 and 236 formed adjacent opposite ends of the bracket 201. As will become apparent, the unique incorporation of the screws 219a and 219b allows for the subsequent manual adjustment of the axial extension of the length of the screws 219a and 219b from the top surface of the leg portion 207 of the bracket whereby, upon placement of the frame 14 upon the bracket 201, a minor amount of canting of the frame 14 relative the bracket 201 is achieved without having the need to dismount the wall bracket 201 in order to obtain desired orientation of the wall hanging 10 upon the wall through a trial and error process.

In operation, the approximate or desired height or location for the wall hanging 10 upon the wall is selected and marked. The mounting bracket 201 is manually placed at the desired height, flush with the vertical surface to which it is to be attached and the bolt or first attachment means 208 is placed through slot 202 and loosely tightened to initially engage the vertical surface. The other end of the bracket 201, may be manually held at this time and is free to pivot about the first loosely attached end. The bracket 201 may then be leveled to the horizontal by viewing the bubble level 218 and vertically adjusting the free end of the bracket 201 until the entire bracket 201 is disposed in a level orientation. The other plurality of fasteners or attachment means 210 and 212 may then inserted through their respective slots 204 and 206 and tightened to fixedly mount the said bracket 201 to the wall in such a level horizontal position. The wall hanging 10 may then be positioned upon the bracket 201 in the manner previously described to mount the hanging 10 in a desired location.

If the wall hanging 10 need only remain in the fixed horizontal level orientation, no further adjustments need be made. However, there are times when the wall hanging 10 is placed next to a door frame or other permanent structure 238 which is not correctly plummed. More specifically, referring to FIG. 11, the placement of the wall hanging 10 near a non-plummed door frame 238 may result in an aesthetically unpleasing arrangement. To adjust the picture's orientation, even after the mounting bracket 201 is rigidly affixed to the wall, rapid vernier adjustment may be provided by threadingly inserting or withdrawing one or both of the vernier adjusting screws 219a and 219b after the bracket 201 is fixedly mounted on the wall. To adjust the wall hanging 10, the hanging 10 is lifted vertically to raise the frame 14 and its attached mounting screw 216 out of the slot 214 and remove the same from the bracket 201. The adjustment screw 219a or 219b, depending on which side or end of bracket 201 is desired to be raised, is axially extended or retracted the desired amount to raise or lower the respective end of the wall hanging 10. The wall hanging 10 is then replaced on the mounting bracket 201 so that the mounting screw 216 is reinserted through central slot 214 whereby the undersurface of the frame 14 contacts and is supported upon the heads of the adjustment screws 219a and 219b. Any lateral adjustment can be made by sliding the frame 14 relative the bracket 201 while retaining the mounting screw 216 engagement within the central slot 214. Note that mounting screw 216 may be any protrusion, a wooden dowl or peg for example, so that the frame 14 won't slide off the bracket 201. As such, the use of the vernier adjustment, screws 219a and 219b provides for advantages not available to other devices, since the mounting bracket 201, once affixed to the wall, need not be removed to enable minor adjustment.

Referring now to FIG. 12, a free standing mounting device 239, for use in areas where wall space is unavailable or for use when portability of the wall hanger heating device 10 is desired, is depicted. The base consists of two U-shaped pipe elements 240 and 242 disposed in a common plane and rigidly attached to one another via a rectangular base plate 244. Centrally extending perpendicularly and upwardly from the base plate 244 is a first tubular member 246 which is fixedly mounted at one end to a standard pipe coupling 248 attached to the base 244 and is provided on its opposite end with a standard bell coupling/bell-reducer 250. A second tubular member 254, having an outside diameter sized to be smaller than the inside diameter of the first tubular member 246 is telescopingly positioned within the first tubular member 246. A thumb screw 252 extending radially through the bell-reducer 250 is additionally provided to permit or restrict relative axial position of the first and second tubular members. A pair of mounting brackets 201 may be attached by conventional fastening means such as screws or weldments to the top end of the tubular member 254 to provide a mounting means for the wall hanging 10.

In operation, the particular room or location for the free standing mounting device 239 is selected. The stand 239 may then be placed at that location. By firmly grasping the second tubular member 254 with one hand, the thumb screw or retaining means 252 may be disengaged by the operator so that the said second tubular member can freely telescope out from or into the length of first tubular member 246 to the desired height. The retaining means 252 may then be tightened to contact the second tubular member 254 and retain the same at such desired height. The wall hanging 10 is then placed upon the stand 239 by resting the frame 14 on the mounting bracket 201 so that the mounting screw 216 is inserted through central slot 214 of the bracket 201. The level of the wall hanging 10 may then be adjusted as earlier discussed by varying the insertion or extension of adjusting screws 219a and 219b.

The wall hanging 10 provides many advantages which are not found in the prior art. These advantages include such features as easy and secure mounting to the wall, theft detection, and, most importantly, a beautiful and decorative way to provide heat to a living area.

The wall hanging 10 has low radiation losses and supplies heat to the air in a room by convective flow of air over the panel 12. The panel 12 heats air adjacent thereto, causing the air to rise and be replaced by cooler air beneath the frame 12. It has been found that by providing as little as 2 watts per square foot of floor space, so that for example, in an average room in Southern California, adequate heating for reasonable comfort can be provided. Air flowing past the panel is heated about 20 degrees in passing from the lower edge to the upper edge. The efficiency increases as the difference between panel 14 temperature and ambient temperature increases. The invention has a high efficiency because it does not waste heat at the ceiling level, providing substantially uniform temperature throughout a room. Recommended power requirements are about 6 watts per square foot for other types of heaters.

It will be recognized that while the circuitry shown is generally that for a 120 volt system, the heaters can be and are designed for use with a 240 volt system as well. Having described a preferred embodiment of the invention, various modifications will now become apparent from the specification and the drawings which fall within the scope of the appended claims.

What is claimed is:

1. A combination decorative wall hanging and panel heater, comprising:

a front panel surface formed as a sheet having decorative coloring and a flange formed to extend generally at right angles from the edges thereof;

a frame formed to surround the front panel and for securement to the flange;

a layer of material having heat conducting and electrical insulating properties juxtaposed to the front panel;

a second layer of material having dielectric properties juxtaposed to the first layer of material;

a heater element including a layer of graphite saturated fabric having a pair of busses positioned along a pair of opposite edges of the layer of graphite saturated fabric;

means for supplying electrical current to the busses for application to the heating element;

a thermal cut-off switch connected to the heater and in series with the means for supplying electrical current;

thermostat means for variably regulating the heat output of the panel heater;

a backing panel having a flange adapted to be secured to the frame;

an electrically conductive bracket adapted to be attached between the front panel and the backing panel;

a junction box having a plurality of vents for allowing air circulation therethrough attached to the backside of the heater for housing the thermostatic means;

bracket means for supporting the wall hanging to a vertical surface; and alarm means for providing a warning whenever the frame is removed from the vertical surface;

said bracket means comprising a mounting plate formed to be secured to a vertical surface;

a supporting plate integrally formed with and extending perpendicularly from said mounting plate sized to capture a portion of said frame;

a level means located on said mounting plate for indicating the relationship of said supporting plate to the horizontal; and a pair of vernier adjusting means located on said supporting plate for adjusting the level of said frame relative said supporting plate after said frame is captured by said supporting plate.

2. The device of claim 1 wherein said level means comprises a bubble level.

3. The device of claim 2 wherein said vernier adjusting means comprises a pair of threaded fasteners extending through said supporting plate and positioned to support a portion of said frame and cant said frame relative said supporting plate.

* * * * *